US007894918B2

(12) United States Patent
Kanodia et al.

(10) Patent No.: US 7,894,918 B2
(45) Date of Patent: Feb. 22, 2011

(54) SYSTEM FOR ANALYZING BATCH PROCESSES

(75) Inventors: Hemant Kanodia, Solon, OH (US); Mikael H. Davidsson, Lakewood, OH (US); Rajani Nair, Twinsburg, OH (US); Anne Poorman, Lyndhurst, OH (US); Joachim Ruhe, Mentor, OH (US); Patrick M. Martin, Mentor, OH (US)

(73) Assignee: ABB Research Ltd., Zurich (CH)

( * ) Notice: Subject to any disclaimer, the term of this patent is extended or adjusted under 35 U.S.C. 154(b) by 677 days.

(21) Appl. No.: 11/494,099

(22) Filed: Jul. 27, 2006

(65) Prior Publication Data
US 2008/0127186 A1 May 29, 2008

(51) Int. Cl.
*G05B 11/01* (2006.01)
(52) U.S. Cl. .......................... 700/17; 700/83; 700/265
(58) Field of Classification Search .................. 700/17, 700/83, 265, 285, 99
See application file for complete search history.

(56) References Cited

U.S. PATENT DOCUMENTS

| | | | | |
|---|---|---|---|---|
| 6,522,939 | B1 * | 2/2003 | Strauch et al. | 700/116 |
| 6,587,744 | B1 * | 7/2003 | Stoddard et al. | 700/121 |
| 7,020,876 | B1 | 3/2006 | Deitz et al. | |
| 7,123,978 | B2 | 10/2006 | Hartman et al. | |
| 7,249,356 | B1 * | 7/2007 | Wilson et al. | 718/101 |
| 2002/0059003 | A1 * | 5/2002 | Ruth et al. | 700/19 |
| 2002/0077711 | A1 * | 6/2002 | Nixon et al. | 700/51 |
| 2003/0100970 | A1 * | 5/2003 | Chen | 700/108 |
| 2006/0132321 | A1 * | 6/2006 | Thouin et al. | 340/679 |
| 2006/0195201 | A1 * | 8/2006 | Nauck et al. | 700/30 |

FOREIGN PATENT DOCUMENTS

| | | |
|---|---|---|
| EP | 0574337 | 12/1993 |
| EP | 1884850 | 11/2007 |
| WO | WO2006/039760 | * 10/2005 |

OTHER PUBLICATIONS

Plastrier, Mike Le,"Batch Plants Have Personality." SA Instrumentation & Control. May 2006.
Joydeep Ganguly & Gerrit Vogel, "Process Analytical Technology (PAT) and Scalable Automation for Bioprocess Control and Monitoring—A Case Study", Pharmaceutical Engineering Jan./Feb. 2006.
"Synergy 2000, Enterprise-Wide Statistical Process Control Software", Zontec Inc., Jan. 2006.
'DeltaV, Batch Operator Interface, Product Data Sheet, Jun. 2003, Emerson Process Management.

* cited by examiner

*Primary Examiner*—Kidest Bahta
*Assistant Examiner*—Nathan Laughlin
(74) *Attorney, Agent, or Firm*—Paul R. Katterle

(57) ABSTRACT

The present invention is directed to a batch system for managing and analyzing batch runs of a batch process in a process cell. The batch system includes a computer readable medium, a plurality of batch management routines and a plurality of batch analysis routines stored on the computer readable medium and adapted to be executed by the at least one processor. The batch management routines are operable to schedule batch runs and create and edit recipes for the batch process. The batch analysis routines include a batch filter routine, a golden batch routine, a cycle time analysis routine, and a report wizard routine.

13 Claims, 16 Drawing Sheets

SYSTEM FOR ANALYZING BATCH PROCESSES

BACKGROUND OF THE INVENTION

The present invention is directed toward batch processes and, more particularly, toward a system and method for analyzing a batch processes from the same point that the batch processes are managed and controlled from.

A batch process is a process in which a limited quantity of ingredients are added and processed in a step-wise fashion. A recipe defines the equipment, procedures and formula used to run a batch process. An automated batch process is typically controlled by a process automation system having controller subsystems for controlling the valves, pumps and other physical equipment required to perform the batch process. When a plurality of batch processes are being run to produce a plurality of different products, a software batch management application is typically provided to interface with the process automation system. In such a case, the controller subsystems store and execute control logic for executing procedures within the batch process (such as delivering ingredients to a reactor), while the batch management application will allocate and de-allocate equipment, store recipes, schedule batch processes, generate reports, and store and archive batch data. The batch management application may also provide process variable setpoints to controller subsystems and may control the execution of batch procedures, such as stopping a current batch procedure, or starting a subsequent batch procedure. A batch management application typically has a graphical user interface (GUI), which may be integrated with a GUI of the process automation system.

Although conventional batch management applications facilitate the management and execution of batch processes, conventional batch management applications do not provide a batch operator with information in a format that will enable the batch operator to facilely compare data from a current batch to data from prior successful batches. Moreover, conventional batch management applications do not provide a mechanism by which data from prior batches can be facilely screened to eliminate data from outlier batches before such batch data is used for comparison or other purposes. Therefore, it would be desirable to provide a batch analysis application that provides the foregoing beneficial features. The present invention is directed to such a batch analysis application.

SUMMARY OF THE INVENTION

In accordance with the present invention, a batch system is provided for managing and analyzing batch runs of a batch process in a process cell. The batch system is adapted for use with a process automation system that is operable to monitor and control the batch process. The process automation system includes at least one processor, an input device that is coupled to the at least one processor and is configured to receive user input, and a display device that is coupled to the processor. The batch system includes at least one computer readable medium and program instructions stored on the at least one computer readable medium. The program instructions are executable by the at least one processor to display a plurality of windows on the display device. In one embodiment, data for a hypothetical ideal batch run of the batch process can be entered through one of the windows and real-time data for a batch run of the batch process that is currently running can be received. A trend graph can be displayed in another window. The trend graph shows a trend line formed from the data for the hypothetical ideal batch run and a trend line formed from the real-time data received from the batch process.

In another embodiment of the present invention, the process cell includes first and second pieces of equipment, each of which is operable to perform a procedure of the batch process. In this embodiment, the batch system further includes a database that is stored on the at least one computer readable medium and contains data for previous batch runs. Batch runs can be selected for analysis in a window and the program instructions are executable to retrieve data for the selected batch runs from the database. Another window contains an average cycle time for all of the selected batch runs, an average cycle time for those of the selected batch runs performed with the first piece of equipment and an average cycle time for those of the selected batch runs performed with the second piece of equipment.

BRIEF DESCRIPTION OF THE DRAWINGS

The features, aspects, and advantages of the present invention will become better understood with regard to the following description, appended claims, and accompanying drawings where:

DETAILED DESCRIPTION OF ILLUSTRATIVE EMBODIMENTS

Figure 1:
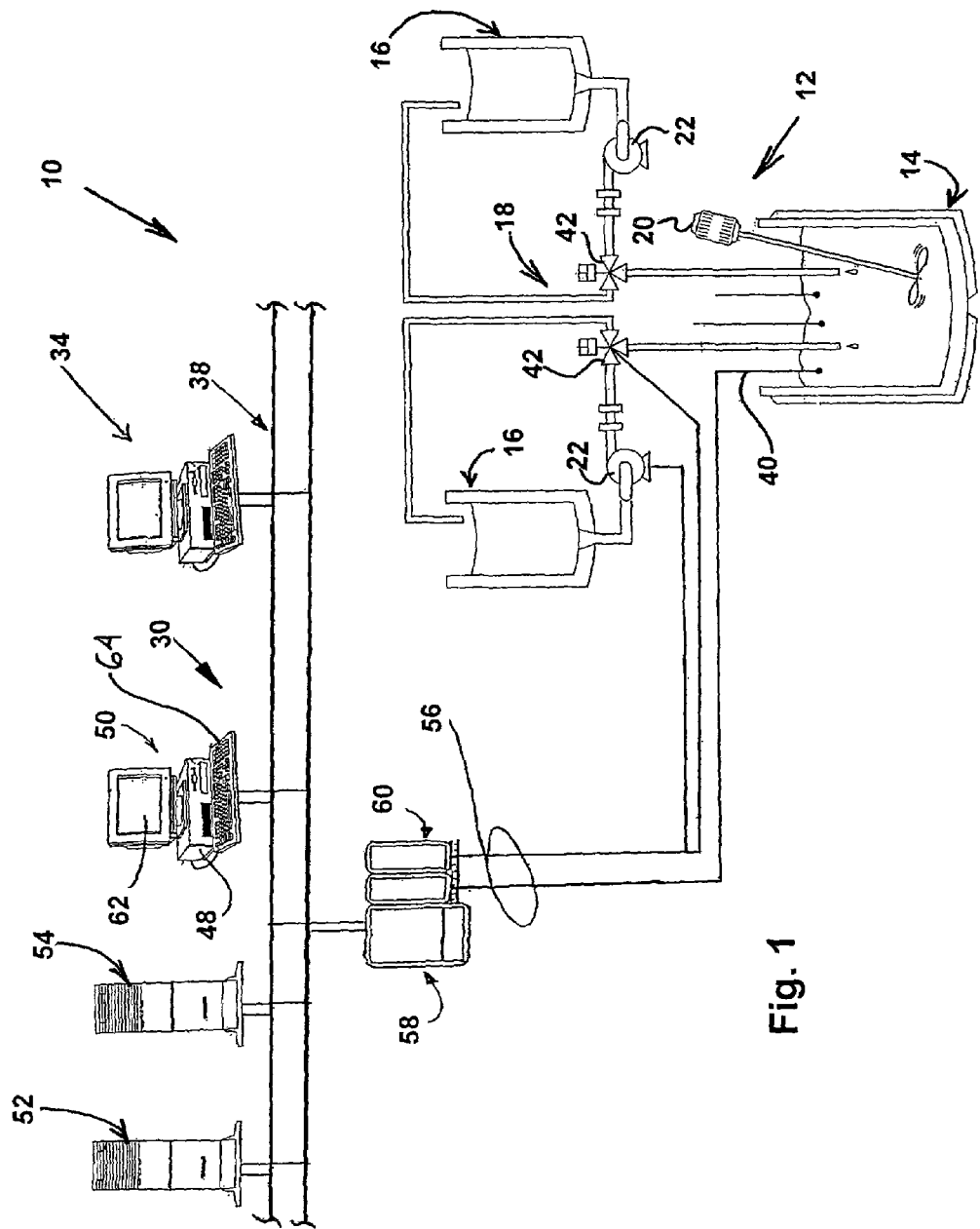
FIG. 1 is a schematic view of a portion of an enterprise having a process cell for performing batch processes.

It should be noted that in the detailed description that follows, identical components have the same reference numerals, regardless of whether they are shown in different embodiments of the present invention. It should also be noted that in order to clearly and concisely disclose the present invention, the drawings may not necessarily be to scale and certain features of the invention may be shown in somewhat schematic form.

As used herein, the following terms shall have the following meanings:

"batch process" shall mean a process in which a limited quantity of ingredients are added and processed in a stepwise fashion;

"batch run" shall mean a performance of a batch process;

"recipe" shall mean an identification of the equipment, procedures and formula used to run a batch process;

"header" shall mean a component of a recipe identifying the product produced by the batch process;

"batch" shall mean, as appropriate for the context, a batch run, or the product produced thereby;

"batch campaign" is a series of batch runs using the same recipe.

Referring now to FIG. 1 there is shown a schematic drawing of a portion of an enterprise 10 that can benefit from the use of the present invention. The enterprise includes a process cell 12 operable to perform one or more batch processes. The process cell 12 includes a mixing vessel or reactor 14, a plurality of ingredient storage tanks 16, and a piping system 18 connecting the ingredient storage tanks 16 to the reactor 14. The reactor 14 includes a stirring device 20 for mixing ingredients during the batch process. The piping system 18 has pumps 22 for pumping ingredients from the ingredient storage tanks 16 to the reactor 14. The batch processes may be processes for the manufacture of beer, paint, pharmaceutical compounds, specialty chemicals, or other types of batch-made products.

For purposes of monitoring and controlling the process cell 12, the enterprise 10 is provided with process field devices, a process automation system 30, a batch system 32 (see FIG. 2) and a remote client 34, all of which are interconnected by a network 38.

Process Field Devices

The process field devices include monitoring devices (such as sensors 40) and control devices (such as valves 42) for monitoring and controlling the batch processes. The process field devices communicate operating values of the batch process to the process automation system 30 over a field network 56, which may utilize shielded twisted pair wires, coaxial cables, fiber optic cables, or wireless communication channels.

Process Automation System

The process automation system 30 is preferably a distributed control system, such as a System 800xA distributed control system, which is commercially available from the assignee of the present invention, ABB Inc. The process automation system 30 interacts with the batch system 32 and is operable to: store and execute control logic for procedures of a recipe for a batch process; send transaction messages to the batch system at the end of a phase; react to abnormal conditions; and generate exception and event messages and alarms. The process automation system 30 generally includes at least one control work station 50, server computers 52, 54, and one or more controllers 58. Input signals from the field devices are communicated over the field network 56 to the network 38 by 4-20 mA signaling and/or by one or more of the conventional control protocols, such as the HART® protocol, the Foundation™ Fieldbus protocol, or the Profibus protocol. For any of the field devices communicating via the Foundation™ Fieldbus protocol, the field network 56 comprises HSE/H1 linking devices, which connect the field devices to a high speed Ethernet subnet, which is connected to the network 38 through an FF HSE communication interface of the controller(s) 58 or through an FF OPC server (not shown). For any field devices communicating via the Profibus protocol, the field network 56 comprises DP/PA linking devices, which connect the field devices to a Profibus-DP line, which is connected to the network 38 through a Profibus communication interface of the controller(s) 58 or through a Profibus OPC server (not shown). For any field devices communicating via 4-20 mA signaling and/or the HART® protocol, the field network 56 typically comprises shielded twisted pair wires, which connect the field devices to an I/O subsystem 60, which includes one or more I/O modules with one or more associated module termination units, as is shown in FIG. 1. The I/O subsystem 60 is connected by a module bus to the controller(s) 58, which is/are connected to the network 38.

The network 38 interconnects the control work station 50, the server computers 52, 54 and the controller(s) 58. The network 38 includes a pair of redundant Ethernet cables over which information is communicated using the Manufacturing Message Specification (MMS) communication protocol and a reduced OSI stack with the TCP/IP protocol in the transport/network layer. Together, the network 38 and the field network 56 help form a communication link over which information may be transmitted between the field devices and clients.

The controller(s) 58 contain control programs for controlling the batch processes of the enterprise 10. The control programs utilize operating values from the field devices, which are received by the controller(s) 58 from the I/O subsystem 60. The control programs are written in one or more of the five IEC 61131-3 standard languages: Ladder Diagram, Structured Text, Function Block Diagram, Instruction List and Sequential Function Chart. Outputs from the control programs are transmitted to the control devices of the process field devices over the field network 56.

The control work station 50 is a personal computer (PC) with a central processing unit (CPU) 48, a monitor 62 for providing visual displays to an operator and a keyboard 64 for manually entering data. The CPU 48 has an operating system running thereon, which is a Windows® operating system available from Microsoft Corporation. A graphical user interface (GUI) 66 runs on the operating system of the control work station 50.

A connectivity server 72 and an aspect server 74 run on the server computer 52, while the batch system 32 and an asset monitoring system (not shown) run on the server computer 54.

Figure 2:
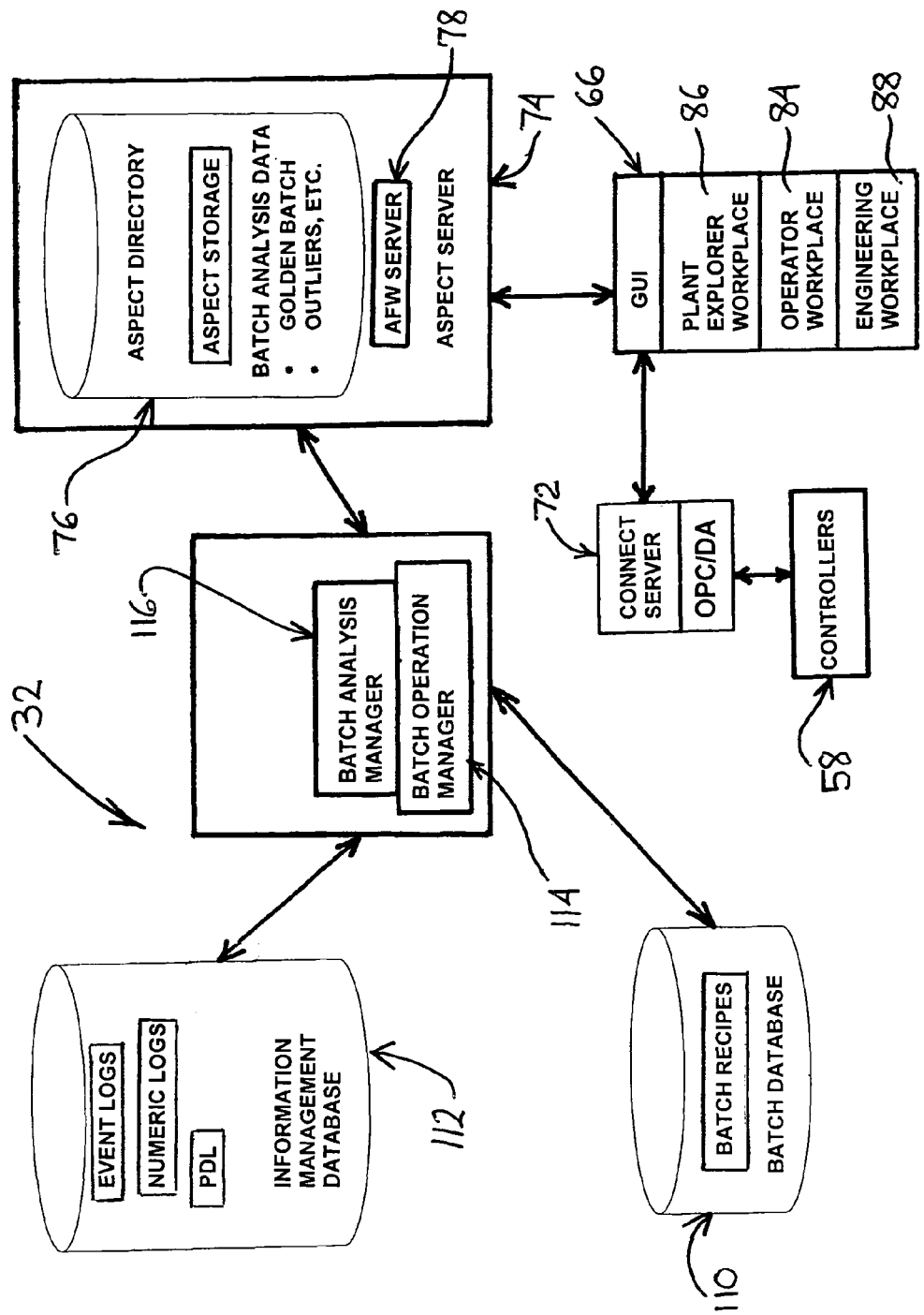
FIG. 2 is a block diagram of a batch system connected to an aspect server and a graphical user interface (GUI) of a process automation system.

Referring now also to FIG. 2, the connectivity server 72 includes an OPC server network based on Microsoft's OLE (now Active X), COM, and DCOM technologies. The OPC server network includes a controller OPC server that makes information from the controller(s) 58 available to any OPC client connected to the network 38, such as the GUI 66. As set forth above, an FF OPC server and/or a Profibus server may also be provided to connect the field devices to the network 38 without having to be connected to the controller(s) 58. The FF OPC server and the Profibus server are also based on Microsoft's OLE (now Active X), COM, and DCOM technologies that make information available to any OPC client on the network 38.

The aspect server 74 includes an aspect directory 76 containing all aspect objects and their aspects, as well as an aspect framework (AFW) server 78. The AFW server 78 is operable to wrap together HTML pages (aspects) for an object in a web-compliant AFW file that can be launched from an object tree 80 in the GUI 66. The aspect server 74 implements a method of organizing information using aspect objects (or simply "objects") and aspects associated with the objects. An object represents physical matter (such as a valve 42) or virtual matter (such as a function) and acts as a holder or container for information (such as run time data) concerning the object. Information concerning an object is contained in its aspects. An aspect is an assembly of information describing certain properties of an object, such as functional properties, physical construction properties and location properties. Information in an aspect is presented in a view, which may be a list, a table, a diagram, a drawing, or a graphic. An aspect may have more than one view.

In the GUI 66, objects and aspects are graphically represented by icons. In the description below, when reference is made to an object or aspect, it should be understood that the reference may be to the icon for the object or aspect and/or to its associated object or aspect, depending on the context.

Figure 5:
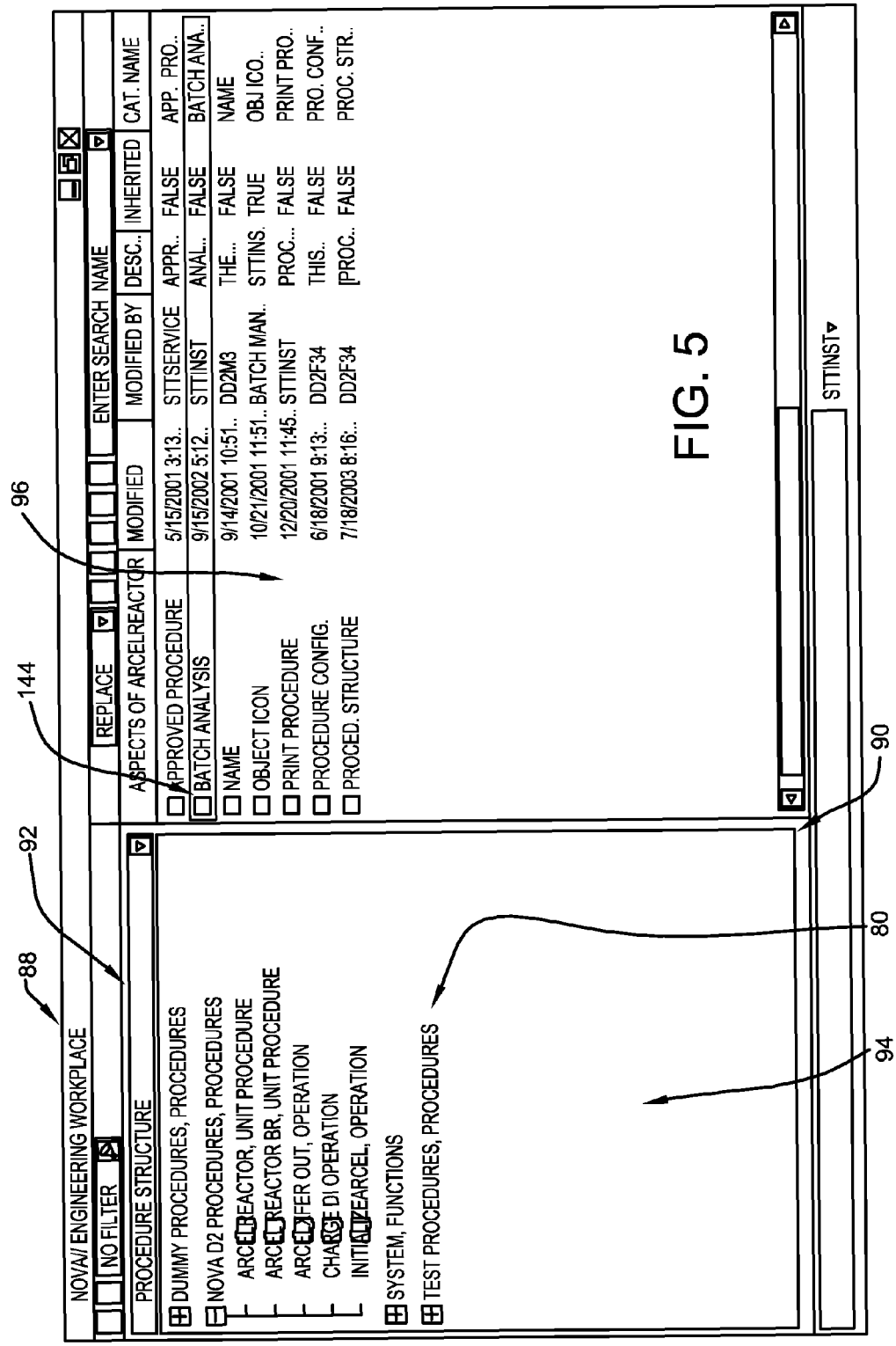
FIG. 5 is a screenshot of an engineering workplace in the GUI showing a batch production analysis aspect.
Figure 6:
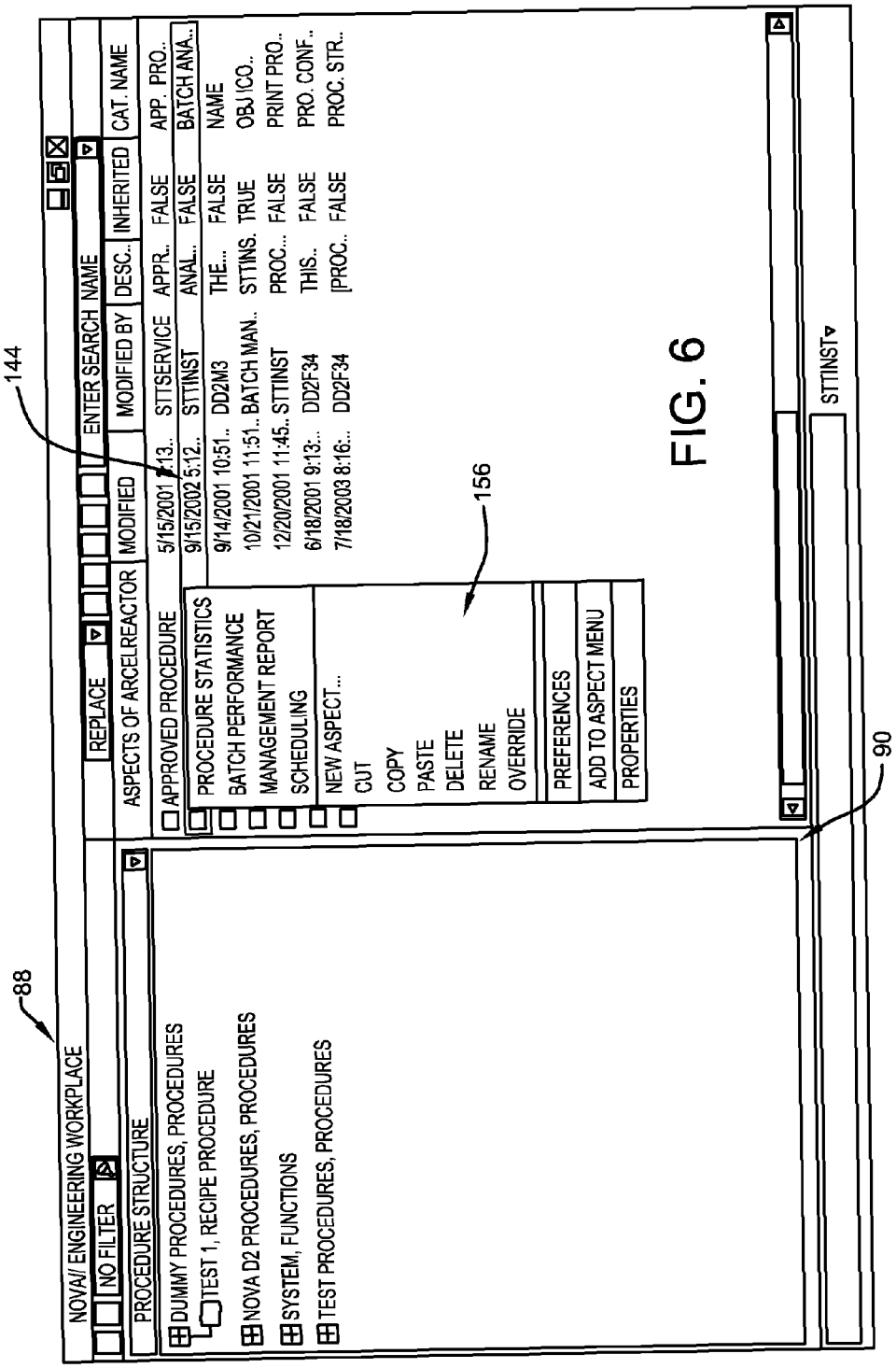
FIG. 6 is a screenshot of the engineering workplace in the GUI showing a pop-up menu accessed from the batch production analysis aspect.

The GUI 66 has a client/server architecture and may have communication based on OPC. A suitable graphical user interface that may be utilized for the GUI 66 is Process Portal™, which is commercially available from the assignee of the present invention, ABB Inc. The GUI 66 has a plurality of workplaces that may be utilized. Each workplace comprises a collection of user-interactive functions (such as tool bars, faceplates, windows, pull-down menus, buttons, scroll bars, iconic images, wizards, etc.) that are combined for a particular use, such as controlling a batch process, maintaining an asset (such as a pump 22) in the enterprise 10, or configuring a model of the enterprise 10. Enterprise personnel may select a particular workplace from a workplace login page of the GUI 66. Three of the workplaces that may be selected are an operator workplace 84, a plant explorer workplace 86 and an engineering workplace 88. The plant explorer workplace 86 is used to explore and build hierarchically structured models of the enterprise 10, while the operator workplace 84 is configured for process operators responsible for controlling the batch processes. The engineering workplace 88 includes tools for implementing and servicing control configurations. The plant explorer workplace 86 and the engineering workplace 88 each include a main window 90 comprising an application bar 92 and a plurality of frames or areas, including an object area 94, an aspect list area 96 and, selectably, a preview area 100. The application bar 92 includes a fixed display area, a tool collection and shortcuts. The object area 94 is where an object browser displays the object tree 80, which is a list or tree of objects for a selected object structure (functional, locational or control), with each root object at a top level and its child objects at a lower or leaf level. An object can be accessed by right clicking on the object in an object tree 80, which opens a context menu containing a number of actions that can be performed. The aspect list area 96 displays all aspects of a currently selected object in an object tree 80. If the preview area 100 is enabled, the preview area 100 displays the view of an aspect currently selected in the aspect list area 96. If the preview area 100 is not enabled, the view of a selected aspect is displayed as a pop-up window. The view of an aspect can also be displayed in the main window 90. In FIGS. 5 and 6, the preview area 100 of the engineering workplace 88 is not enabled.

Batch System

The batch system 32 is a software system that configures, runs and manages batch processes performed by the process cell 12. The batch system 32 configures batch processes by planning, organizing and designing batch control schemes for use by the process automation system 30 in controlling the batch processes. The batch system 32 runs and manages batch processes by: scheduling batches; ensuring that equipment needed by one batch process is not being used by another batch process; guiding the process automation system 30 through the steps or phases of a batch recipe; transmitting values for the various parameters in the batch recipes to the process automation system 30; generating batch reports; and archiving batch data. The batch system 32 comprises a batch database 110, an information management database 112, a batch operation manager 114, a batch analysis manager 116 and a batch client that is integrated into the GUI 66. The batch database 110 stores batch recipes, while the information management database 112 stores batch event logs, batch data logs and a production data log (PDL), which provides hierarchical history logs of batch data and events. The information management database 112 may store event and data logs for other applications within the process automation system 30 in addition to the batch system 32. The batch operation manager 114 has four functional areas: batch operation, recipe management, equipment configuration and batch production history.

The batch system 32 produces recipes for batch processes using an object oriented approach. More specifically, a recipe is produced using a graphical programming routine, wherein a recipe procedure diagram (RPD) 120 (shown in FIG. 3) is drawn using graphical blocks representing sub-recipes, phases and batch manager actions. Batch manager actions (BMA) include allocating hardware resources, sending operator messages and collecting data about process variables. The graphical objects can be combined in any sequence supported by the batch resources, i.e., the process cell, the process automation system 30, etc. Each graphical object represents a software routine, which may cause the process automation system 30 to perform a control action (such as opening a valve 42) or retrieve process data (such as a pressure or a temperature of a fluid). The graphical programming routine permits recipes to be configured as single threads of processing, branched logic, or parallel operations. When a batch is being run by the batch system 32 and the process automation system 30, an operator monitors the progress of the batch by viewing a copy of the RPD 120 for the batch created during recipe configuration.

Figure 3:
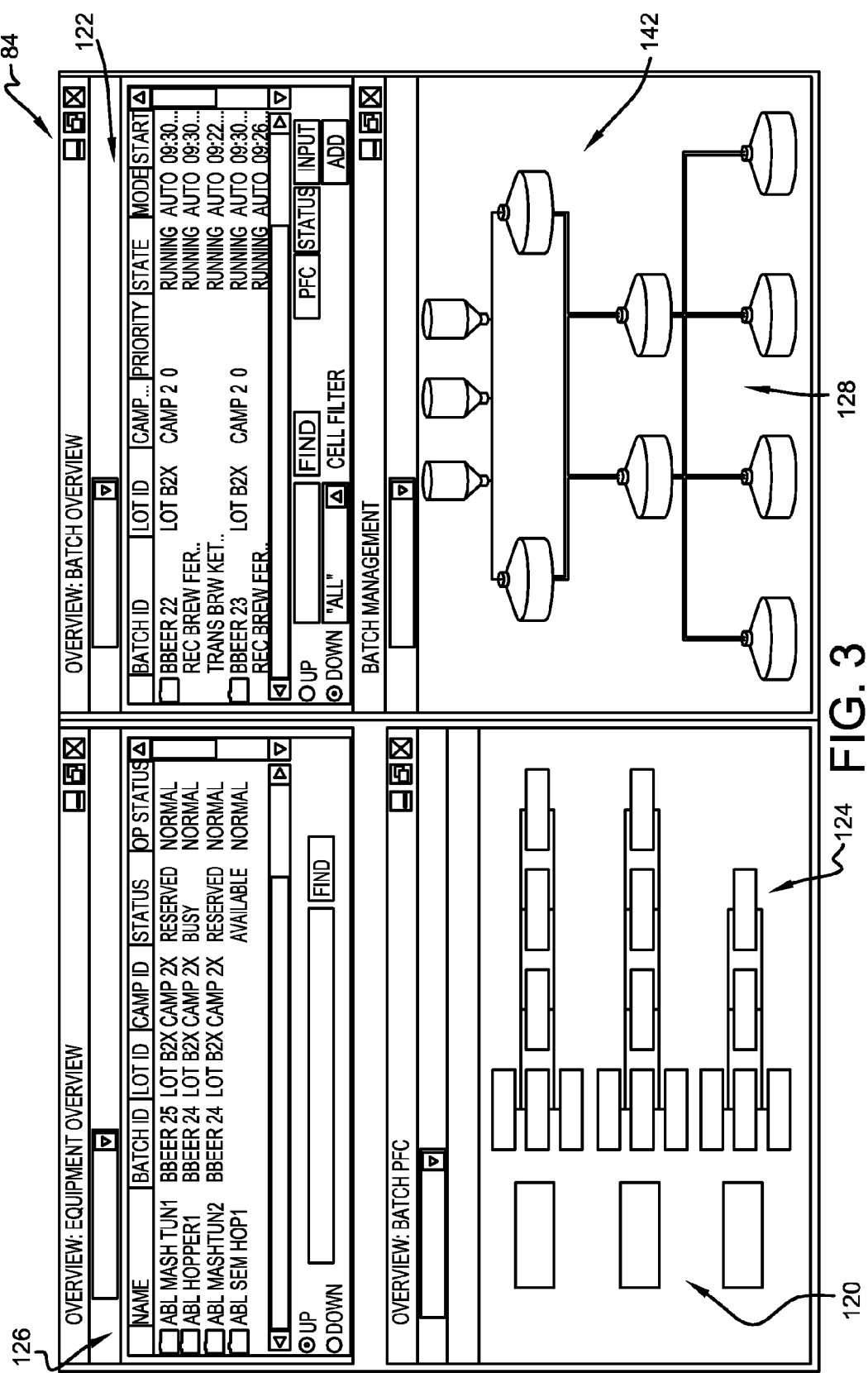
FIG. 3 is a screenshot of an operator workplace in the GUI.

Referring now to FIG. 3, there is shown a view of the operator workplace 84 for a batch process. The operator workplace 84 includes a batch overview window 122, a procedure function window 124, an equipment overview window 126, and a process graphic window 128. The content of the individual windows in the operator workplace 84 is controlled by the batch operation manager 114.

The batch overview window 122 provides access to the batch operation functions and provides a summary of all the batches in the production schedule. Information about the batches is provided in a scroll-down table, wherein the rows represent batches, respectively, and the columns represent different types of information about the batches, respectively. The different types of information include: batch identification, lot identification, campaign identification, recipe identification, batch priority, batch state (i.e., running, aborted, pausing, etc.), mode of operation (i.e., automatic, manual, or semi-automatic), schedule status (i.e., not scheduled, scheduled, active, input pending), and start and end times. Functions that can be accessed through the batch overview window 122 include: scheduling a new batch, invoking a batch information status window 132 for a batch or sub-procedure, displaying an RPD 120 for a batch or sub-procedure in the procedure function window 124, and responding to pending operator messages for a batch.

Figure 4:
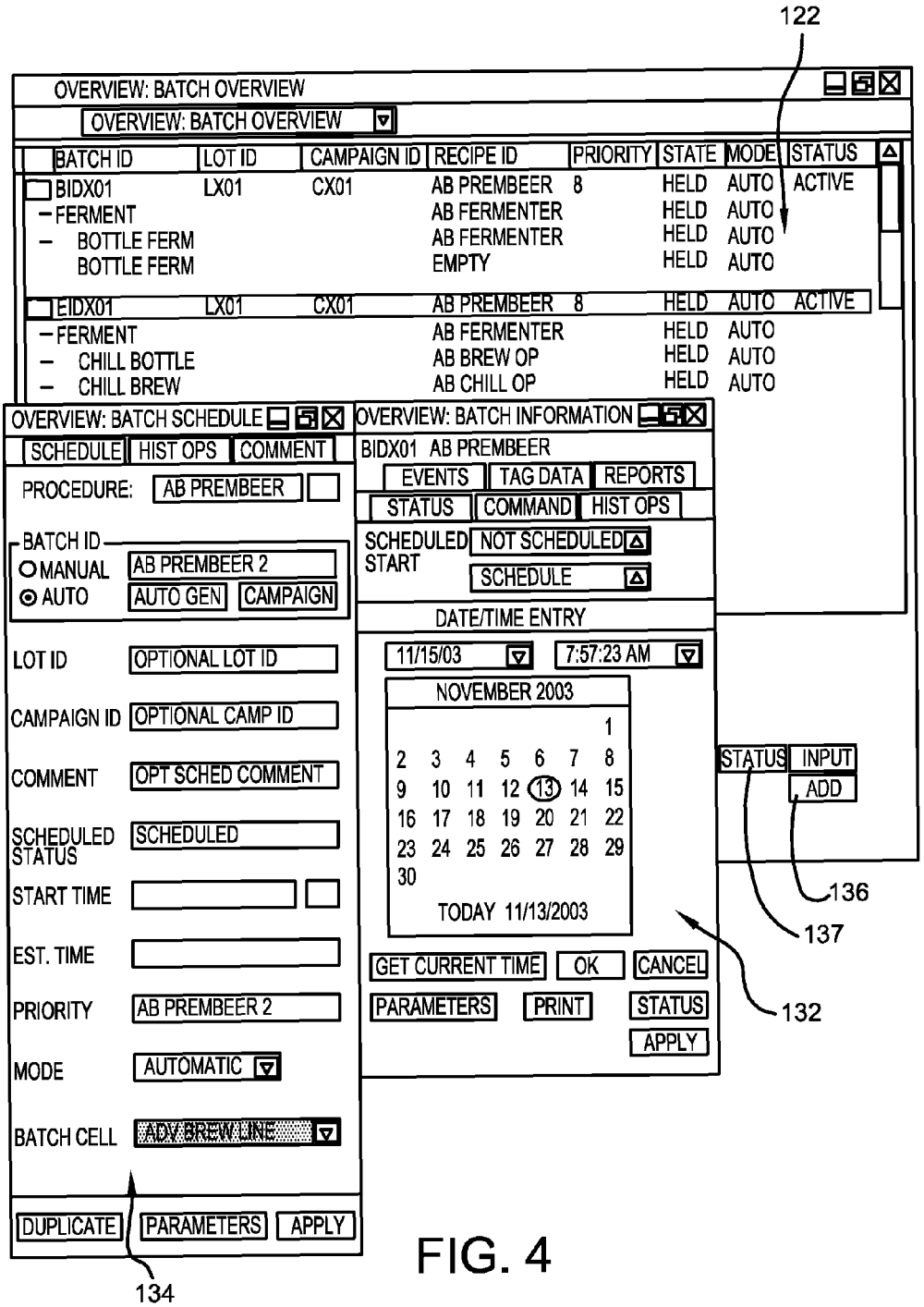
FIG. 4 is a screenshot of a batch overview window, a batch schedule window and a batch information status window in the GUI.

Referring now to FIG. 4, a batch schedule window 134 and the batch information status window 132 can be opened from the batch overview window 122. The batch schedule window 134 permits an operator to schedule a new batch, schedule a campaign of batches and duplicate an existing batch. The batch information status window 132 provides batch status information and enables an operator to issue batch commands. The batch schedule window 134 is accessed by clicking on an "Add" button 136 in the batch overview window 122, while the batch information status window is accessed by clicking on a "Status" button 137 in the batch overview window 122.

The procedure function window 124 displays an RPD 120 for a batch process from which recipe management functions may be performed. The RPD 120 is based on ISA S88 standards and shows each step in a batch procedure using a unique combination of colors and symbols. An operator can navigate between higher and lower levels of the RPD 120. From the RPD 120, an operator can: change the operating mode (automatic, manual, or semiautomatic) at any level in the batch procedure; change the state (running, aborted, stopped, etc.) of an active step at any level in the batch procedure; respond to pending messages; invoke an online procedure editor to make changes to the active batch control recipe; select a restart point for a batch procedure; change a breakpoint or skip status of any step in a batch procedure; view formula information; view the standard operating procedure for the batch procedure; and navigate to an active equipment aspect, such as a graphical control faceplate for controlling a process variable.

The equipment overview window 126 provides a summary of all the equipment in a batch process and provides access to the equipment configuration functions. Information about the equipment is provided in a scroll-down table, wherein the rows represent equipment, respectively, and the columns represent different types of information about the equipment, respectively. The different types of information include: the equipment name; batch identification; lot identification; campaign identification; the status of the equipment (e.g., available, busy, or reserved); and operator status (e.g., normal, disabled, etc.).

An equipment information window (not shown) is accessible from the equipment overview window and can be invoked for any equipment on the equipment overview. Equipment configuration functions can be performed from the equipment information window, namely the following information can be defined for a piece of equipment: equipment description; attributes (including name, value and engineering units) and special characteristics of the equipment, such as operating temperatures, construction materials, etc; the phases processed by the equipment (heat, react, mix, etc.), and the parameters for those phases; whether a piece of equipment is used exclusively for one batch process, or is used for multiple batch processes; and the type of controller controlling the equipment.

The process graphic window 128 displays a graphic 142 of a batch process showing graphical representations of the major components thereof, such as tanks, pumps, etc. The graphic 142 is operable to permit an operator to navigate between the graphic 142 and an RPD 120, and to navigate from the graphic 142 to a pending message and the batch information status window 132. The graphic 142 utilizes Microsoft ActiveX Controls and includes both static and dynamic elements. Dynamic actuation elements that are accessible from the graphic 142, such as buttons and control station faceplates, are interconnected with control programs in the controller(s) 58 and may be manipulated by an operator to: initiate state changes (e.g. block alarms or switch from manual to auto mode); change process values, limits and set-points; and acknowledge alarms. In addition to containing dynamic actuation elements, the graphic 142 may display operating values of a batch process.

The batch analysis manager 116 interfaces with the aspect server 74, the batch database 110 and the information management database 112 to retrieve historical data on batches and to organize this information into a plurality of aspect views that enable personnel to identify batch patterns and deviations therefrom. The batch analysis manager 116 is represented by a batch production analysis (BPA) aspect 144, which is accessed from the plant explorer workplace 86 or the engineering workplace 88. The BPA aspect 144 provides access to a plurality of batch aspect views, including a procedure statistics view 146, a scheduling view 148, a batch performance view 150 and a management report view 152. More specifically, and with reference to FIGS. 5 and 6, clicking on the BPA aspect 144 produces a pop-up menu 156 listing the batch aspect views. Clicking on a desired one of the batch aspect views causes the desired batch aspect view to be displayed in the preview area 100, or in the main window 90.

Figure 7:
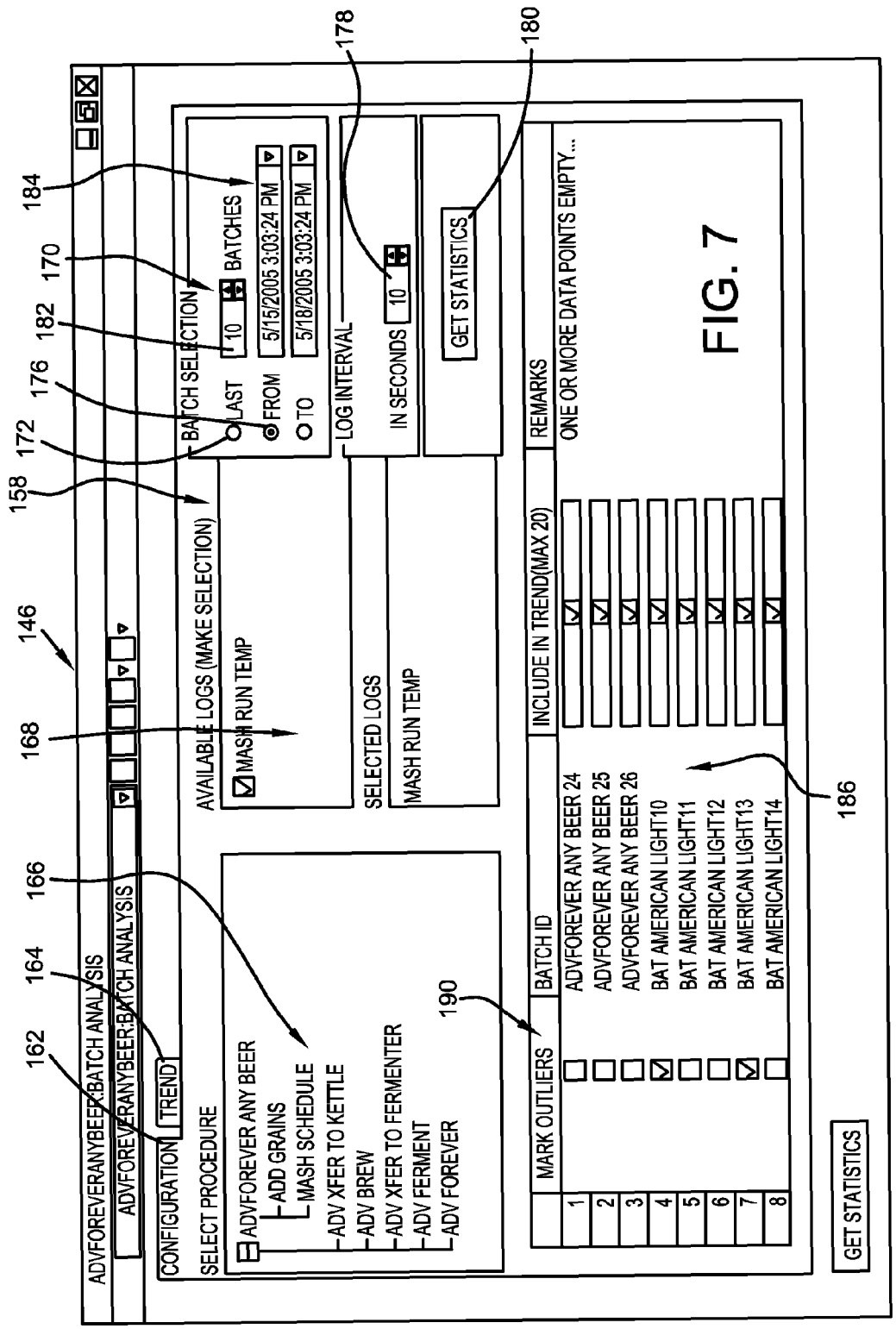
FIG. 7 is a screenshot of a configuration window of a procedure statistics view in the GUI.
Figure 8:
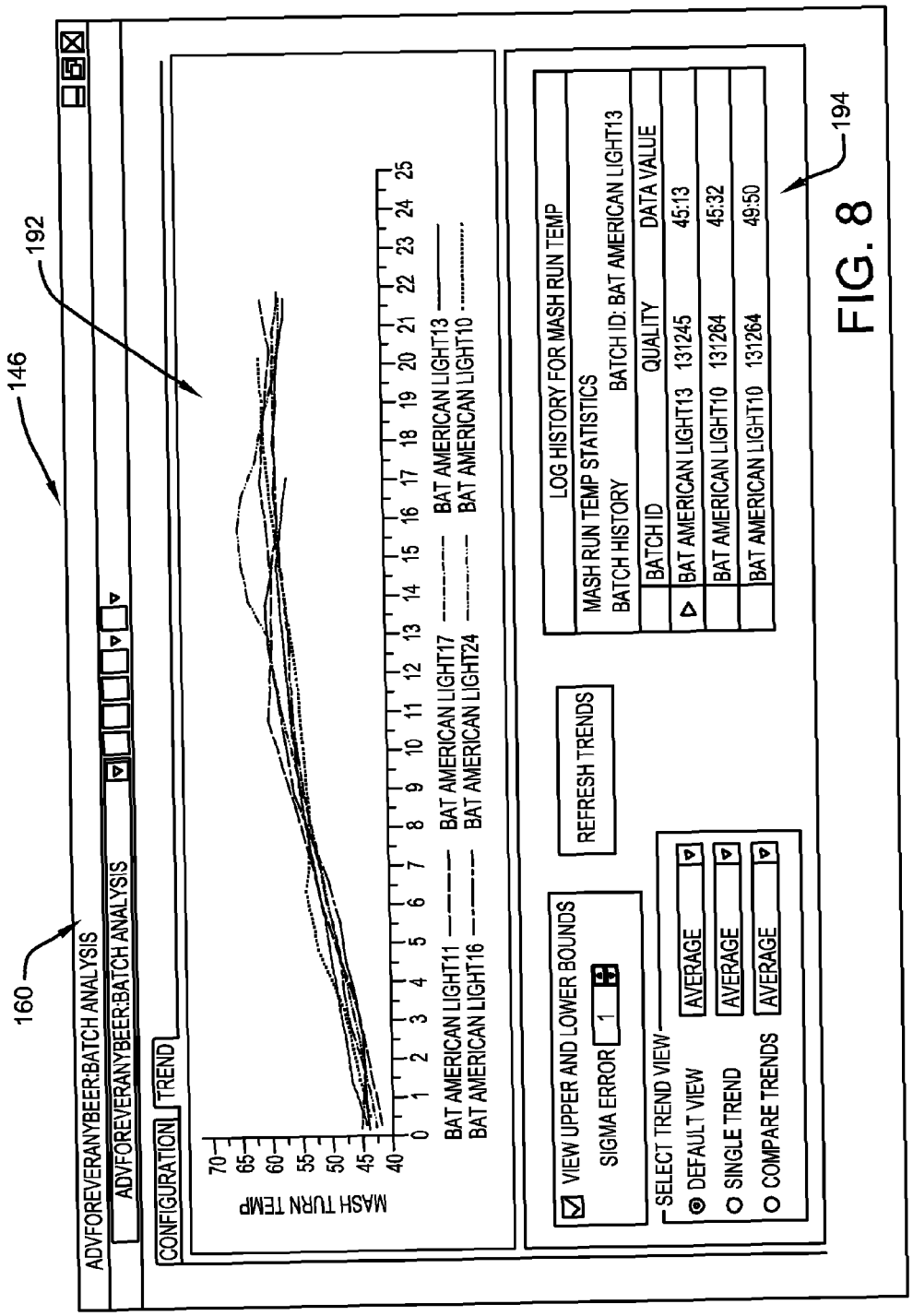
FIG. 8 is a screenshot of a trend window of the procedure statistics view in the GUI.
Figure 9:
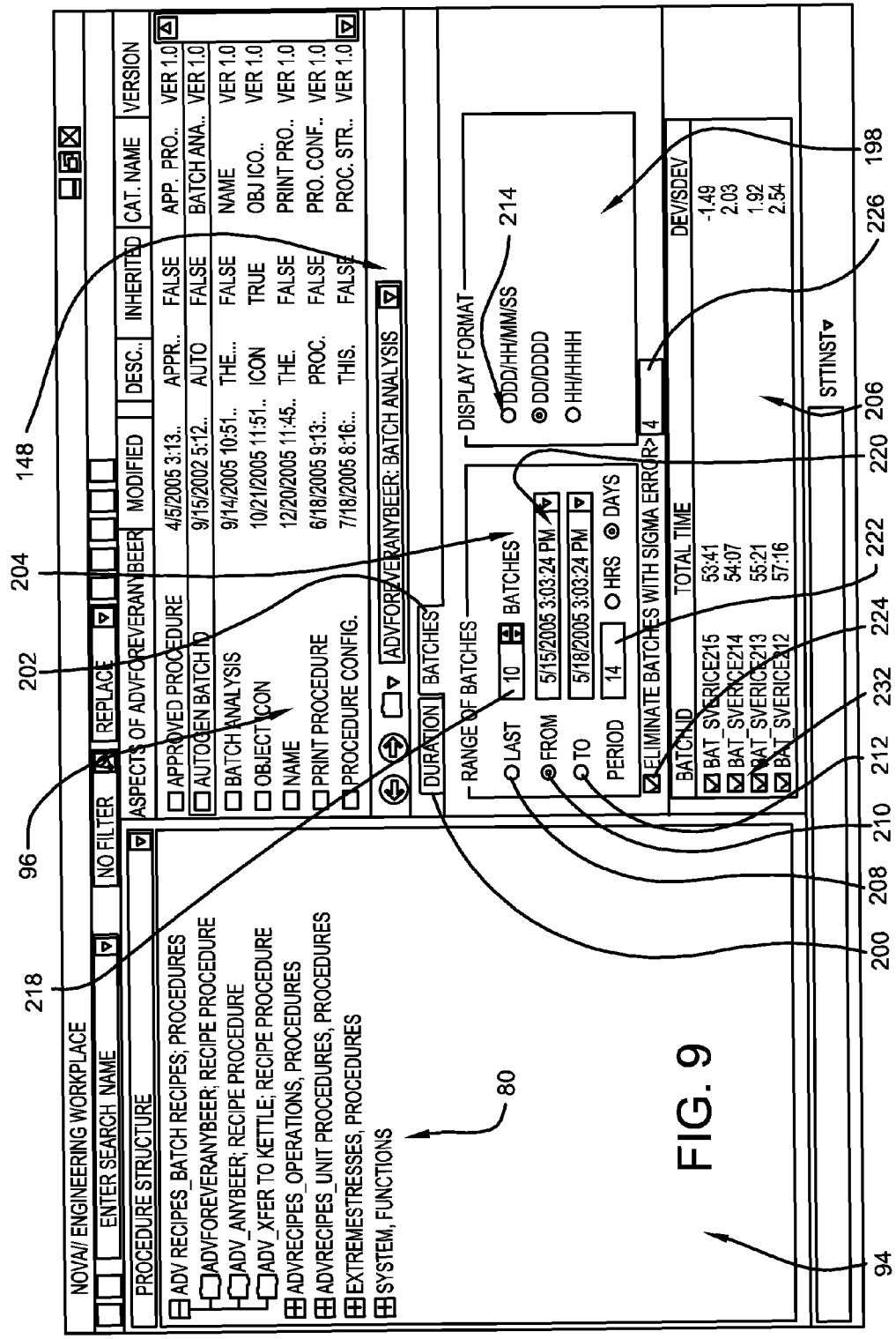
FIG. 9 is a screenshot of a plant explorer workplace in the GUI showing a batch window of a scheduling view.

Referring now to FIGS. 7 and 8, the procedure statistics view 146 is used by engineers to analyze the values of process variables (e.g., temperature, pressure, etc.) in batch procedures. More specifically, the procedure statistics view 146 is used to identify patterns in process variables for a particular batch procedure. An engineer can use these patterns to distinguish outlier batches, which the engineer can eliminate from the pattern identification process. The use of the procedure statistics view 146 is an off-line activity, i.e., is not performed using real time data and is not used to perform real-time activities.

An analysis of a process variable for a batch procedure is performed by first selecting the batch procedure from the object tree 80 in the object area 94 of the plant explorer workplace 86 or the engineering workplace 88. Next, the procedure statistics view 146 for the selected batch procedure is selected from the pop-up menu 156 produced by clicking on the BPA aspect 144 in the aspect list area 96. The procedure statistics view 146 includes a configuration window 158 and a trend window 160 that can be accessed through a configuration tab 162 and a trend tab 164, respectively. The configuration window 158 includes a procedure tree 166 that lists a plurality of sub-procedures of the batch procedure. The sub-procedure containing data collection BMA blocks for the process variable of interest is selected (clicked on) in the procedure tree 166, which causes all of the process variables being collected in the selected procedure or sub-procedure to be displayed in a selection pane 168 to the right of the procedure tree 166. The desired process variable is then selected by checking its associated check box. A batch filter is then set. The batch filter is operable to retrieve process variable data for a set of batches containing the desired batch procedure from the information management database 112. The batch filter can be based on a count, such as the last ten batches, or on a period of time, such as three days. The batch filter is set using a filter pane 170 located to the right of the selection pane 168. The filter pane 170 includes a count radio button 172, a calendar range radio button 176, a log interval thumb scroll box 178, and a get statistics button 180. A count number thumb scroll box 182 is associated with the count radio button 172 and drop-down "from" and "to" date selection boxes 184 are associated with the calendar range radio button 176. The resample period is selected using the log interval thumb scroll box 178. Once the batch filter is set, the get statistics button 180 is clicked on, which causes all of the batches that satisfy the filter to be retrieved and displayed in a batch table 186 located below the procedure tree 166 and the filter pane 170.

Outlier batches can be eliminated from further processing by marking their associated check boxes 190 in the batch table 186. The trend window 160 displays a trend graph 192 for the desired process variable. The trend graph 192 includes trend lines for the retrieved batches (excluding those marked as outliers), respectively, a trend line for the average value of the process variable for the retrieved batches and upper and lower boundary lines, which are produced based on a sigma error selected from an error thumb scroll box. The data for the process variable from the retrieved batches are displayed in a data table 194 located below the trend graph 192.

The scheduling view 148 is used by engineers to determine cycle times of batch procedures and sub-procedures. In addition, the scheduling view 148 provides a breakdown of a sub-procedure's cycle time and correlates it to different pieces of equipment in an equipment group. This breakdown and correlation to equipment can be used to monitor the performance of a particular piece of equipment over time. For example, a user can compare the sub-procedure cycle time for a piece of equipment in a current batch run to the sub-procedure cycle time for the piece of equipment in an earlier batch. The breakdown and correlation to equipment can also be used to compare the performance of a particular piece of equipment versus another piece of equipment. For example, a user can compare the cycle time of a sub-procedure when equipment "A" is used versus the cycle time of the sub-procedure when equipment "B" is used. The use of the scheduling view 148 is an off-line activity.

Figure 10:
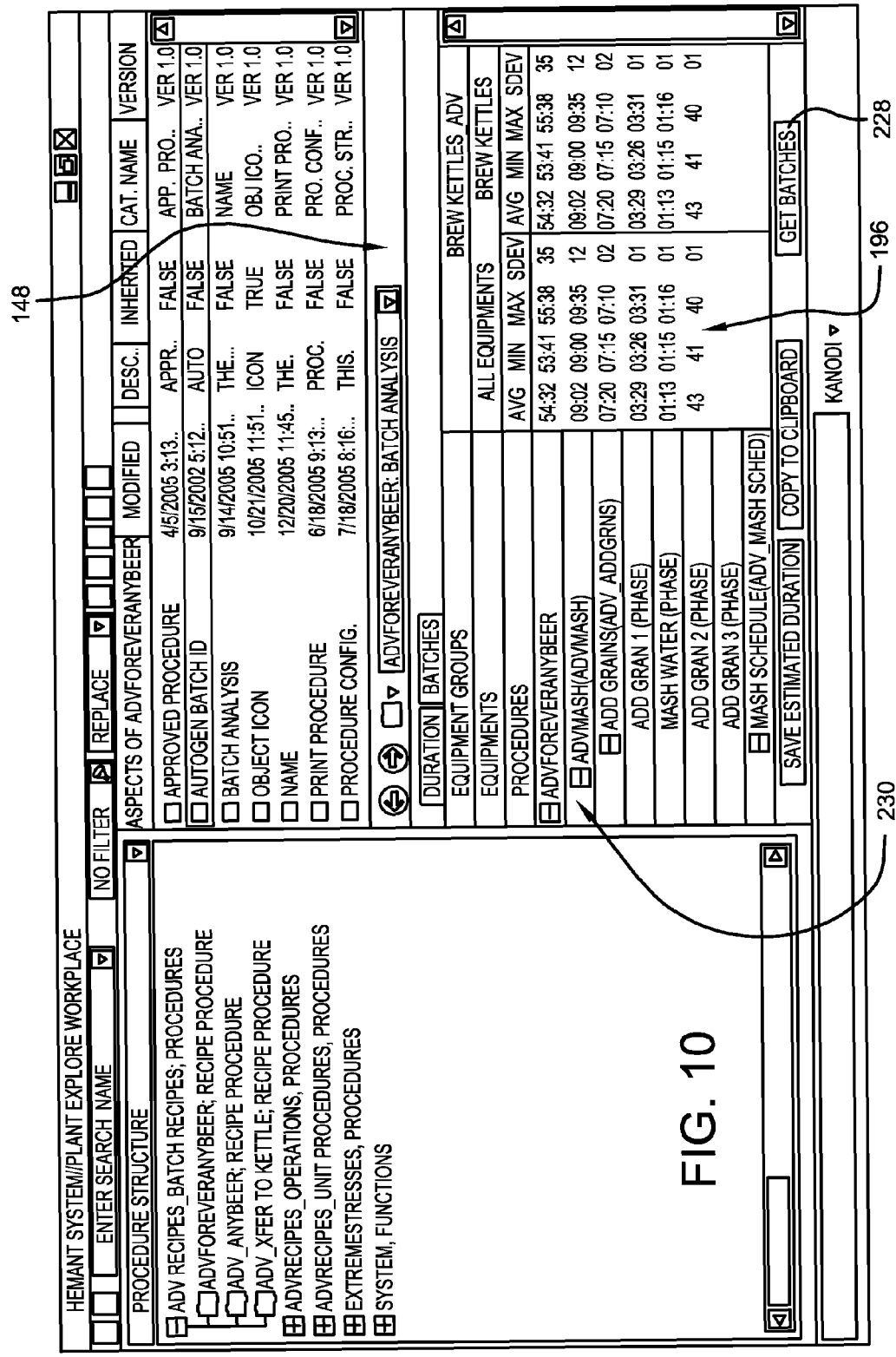
FIG. 10 is a screenshot of the plant explorer workplace in the GUI showing a duration window of the scheduling view.
Figure 11:
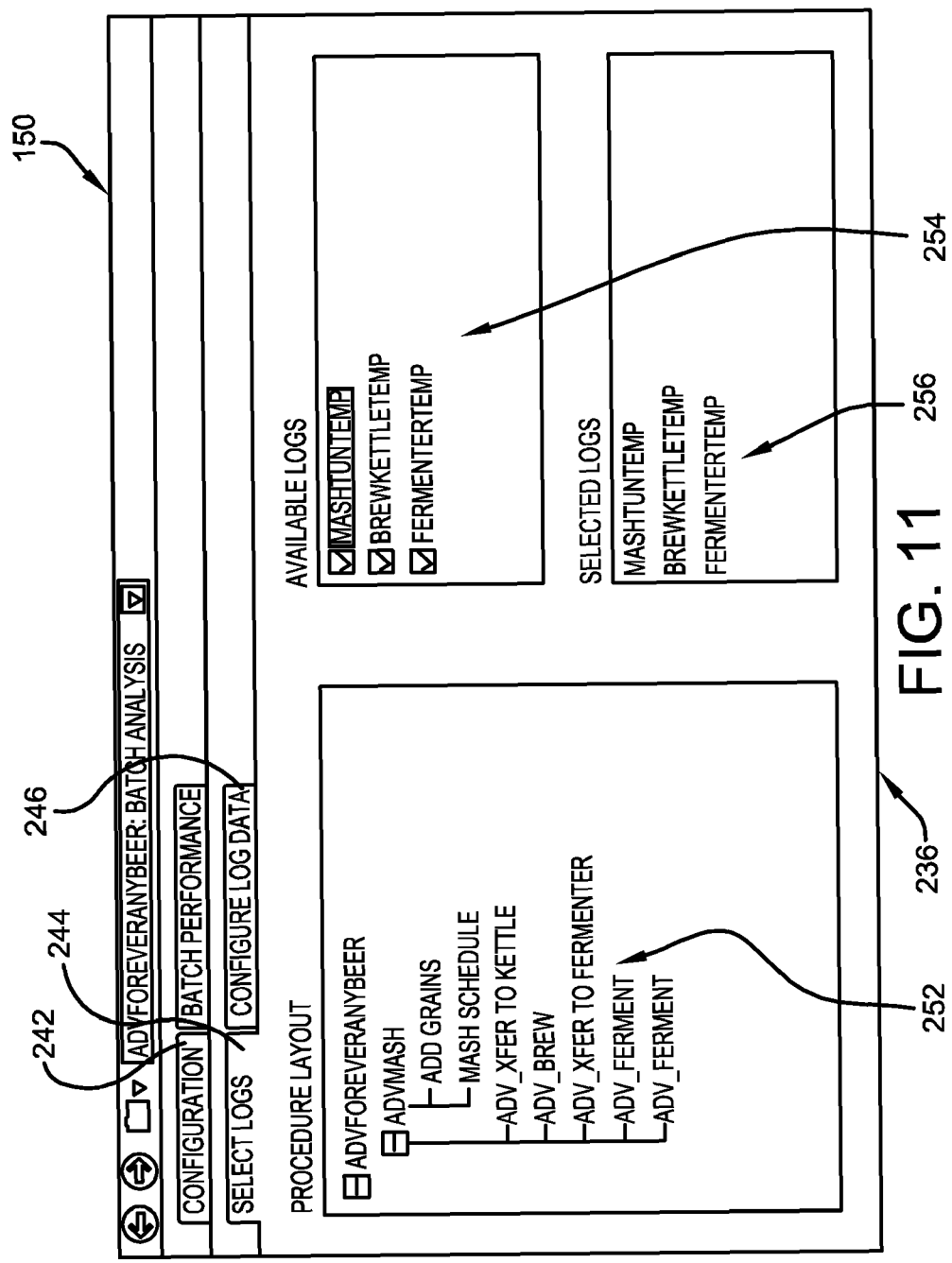
FIG. 11 is a screenshot of a process variable window of a batch performance view in the GUI.
Figure 12:
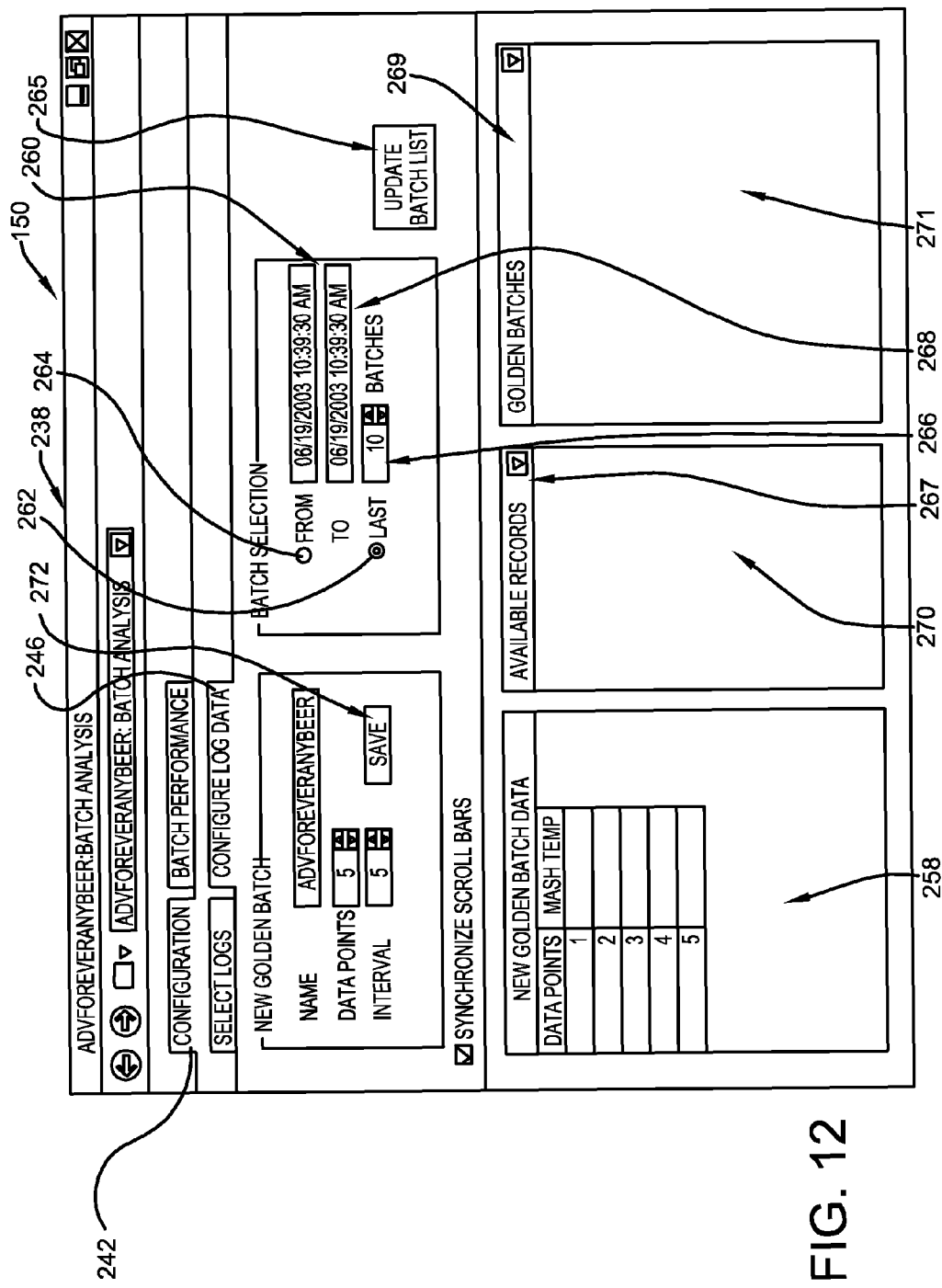
FIG. 12 is a screenshot of a data entry window of the batch performance view in the GUI.
Figure 13:
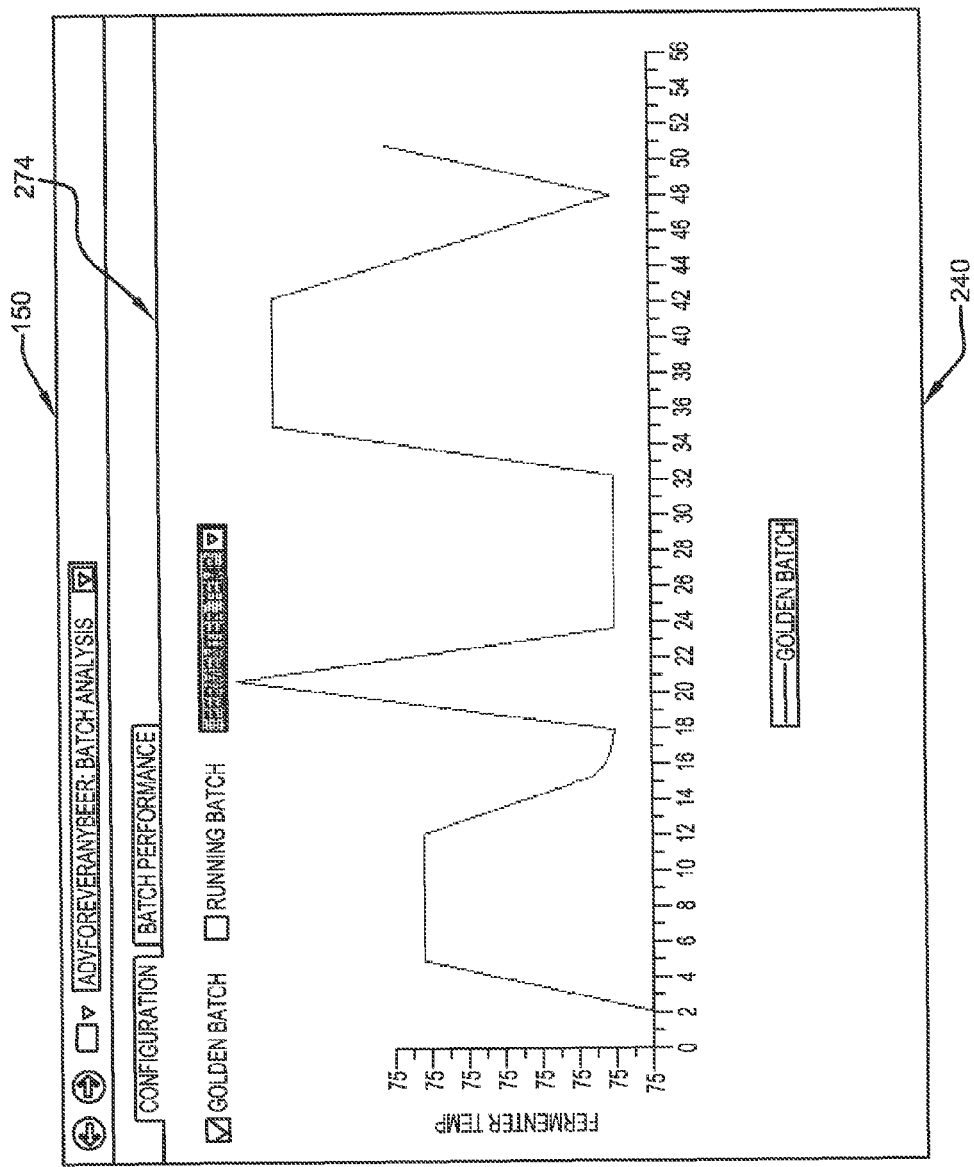
FIG. 13 is a screenshot of a trend display window of the batch performance view in the GUI.

A cycle time analysis is performed for a desired batch procedure by selecting the batch procedure from the object tree 80 in the object area 94 of the plant explorer workplace 86 or the engineering workplace 88. Next, the scheduling view 148 for the selected batch procedure is selected from the pop-up menu 156 produced by clicking on the BPA aspect 144 in the aspect list area 96. The scheduling view 148 includes a duration window 196 and a batch window 198 that can be accessed through a duration tab 200 and a batch tab 202, respectively. A batch filter is then set. The batch filter is operable to retrieve process variable data for a set of batches containing the desired batch procedure from the information management database 112. The batch filter can be based on a count, such as the last ten batches, or based on a period of time, such as fourteen days. The filter is set using a filter pane 204 located above a batch table 206. The filter pane 204 includes a count radio button 208, a calendar range radio button 210, a time period radio button 212 and display radio buttons 214, which permit a user to select a format in which to display cycle time data. The format may be in days (dd.dddd), hours (hh.hhhh) or batch format (i.e., ddd hh:mm:ss). A count number thumb scroll box 218 is associated with the count radio button 208, drop-down "from" and "to" date selection boxes 220 are associated with the calendar range radio button 210, and a time period input box 222 is associated with the time period radio button 212. The filter pane 204 also includes an outlier removal check box 224 and an associated error input box 226. Checking the outlier removal check box 224 and inputting a maximum sigma error in the error input box 226 will cause all batches having an error greater than the maximum sigma error to be identified as outlier batches. Once the filter is set, a user moves to the duration window 196 and clicks on a "Get Batches" button 228, which causes data for all of the batches that satisfy the filter to be retrieved. The batches that satisfy the filter are displayed in the batch table 206, and the average, minimum and maximum cycle times for the batch procedure and its sub-procedures in the batches are calculated and displayed in a tree data table 230 in the duration window 196. Batches can now be manually identified as being outlier batches by un-checking outlier check boxes 232 for the batches in the batch table 206. All batches automatically or manually identified as being outliers are excluded from the calculations for the average, minimum and maximum cycle times displayed in tree data table 230. The tree data table 230 is expandable, i.e., the number of rows increased, to show the cycle times for the sub-procedures. The tree data table 230 also shows the cycle times for the batch procedure and its sub-procedures when certain pieces of equipment are used. For example, as shown in FIG. 10, the cycles times for the batch procedure and its sub-procedures when a kettle, referred to as "BrewKettle2" is used.

Referring back to FIG. 4, the average cycle time for the batch procedure that is calculated by the scheduling view 148 is displayed in the batch schedule window 134 as being the "Estimated Time". As set forth above the batch schedule window 134 is accessible from the batch overview window 122, which, in turn, is accessible from the operator workplace 84.

The batch performance view 150 is used by engineers to define the process parameters of an ideal or golden batch and is used by operators to monitor the process parameters of a running batch vis-à-vis the process parameters of the golden batch. An operator will be able to recognize deviations in the process parameters of a running batch from those of the golden batch and take corrective action in real time. The creation of the golden batch is an off-line activity, but the use of the golden batch is an on-line activity.

A golden batch is defined for a desired batch procedure by selecting the batch procedure from the object tree 80 in the object area 94 of the plant explorer workplace 86 or the engineering workplace 88. Next, the batch performance view 150 for the selected batch procedure is selected from the pop-up menu 156 produced by clicking on the BPA aspect 144 in the aspect list area 96. The batch performance view 150 includes a process variable selection window 236, a data entry window 238 and a trend display window 240. The process variable selection window 236 is accessed by selecting a configuration tab 242 and a select logs tab 244 underneath it, while the data entry window 238 is accessed by selecting the configuration tab 242 and a configure log data tab 246 underneath it. The trend display window 240 is accessed by selecting a batch performance tab 248. The process variable selection window 236 includes a procedure tree 252 that lists a plurality of sub-procedures of the batch procedure. For each process variable of interest, the sub-procedure containing data collection BMA blocks for the process variable is selected (clicked on) in the procedure tree 252, which causes all of the process variables being collected in the selected sub-procedure to be displayed in an availability pane 254 located to the right of the procedure tree 252. The desired process variable is then selected by checking its associated check box. All of the selected process variables are displayed in a selection pane 256 located below the availability pane 254. As shown, a plurality of process variables may be selected.

Once the process variables of interest have been selected in the process variable selection window 236, the ideal or golden data for the selected process variables is added in the data entry window 238. The data can be added by manually typing the data into the appropriate boxes in a data table 258 located at the lower left of the data entry window 238 using the keyboard 64. Alternately, or additionally, data from a previous batch or average data from a plurality of previous batches, or golden data from a previous golden batch can be added to the data table 258. A batch filter is operable to retrieve data from the information management database 112 for the process variables from a set of batches containing the desired batch procedure. The batch filter can be based on a count, or on a period of time. The batch filter is set using a filter pane 260 located above and to the right of the data table 258. The filter pane 260 includes a count radio button 262 and a calendar range radio button 264. A count number thumb scroll box 266 is associated with the count radio button 262 and dropdown "from" and "to" date selection boxes 268 are associated with the calendar range radio button 264. Once the batch filter is set, a user clicks on an "Update Batch List" button 265, which causes data for all of the batches that satisfy the filter to be retrieved and automatically inserted into an available batches combo box 267. When a user selects a batch from the available batches combo box 267, the data for the selected batch is displayed in a batch table 270. A golden batches combo box 269 lists all of the previous golden batches that have been created. When a user selects a batch from the golden batches combo box 269, the data for the selected batch is displayed in a golden batch table 271. A user may add data from the batch table 270 or the golden batch table 271 by simply copying the data from the batch table 270 or the golden batch table 271, as the case may be, and then pasting the data into the data table 258. Once the data has been entered into the data table 258, the data for the golden batch is saved by clicking on a "Save" button 272.

The batch performance view 150 creates trends for the process variables of the golden batch from the data saved in the data table 258. The batch performance view 150 also creates trend lines for the process variables of a running batch. The process variable trend lines of the golden batch and the running batch are displayed together in a trend graph 274 in the trend display window 240. In this manner, an operator can quickly see whether the running batch is departing from the golden batch and can promptly take action to correct the deviation. For example, if an operator sees that the value of a process variable, such as temperature, in a batch process, such as brew operation in a kettle, is substantially higher than the value in the corresponding golden batch, the operator can, through the process graphic window 128 in the operator workplace 84, access a control station faceplate for the temperature in the kettle and lower the temperature in the kettle.

Figure 14:
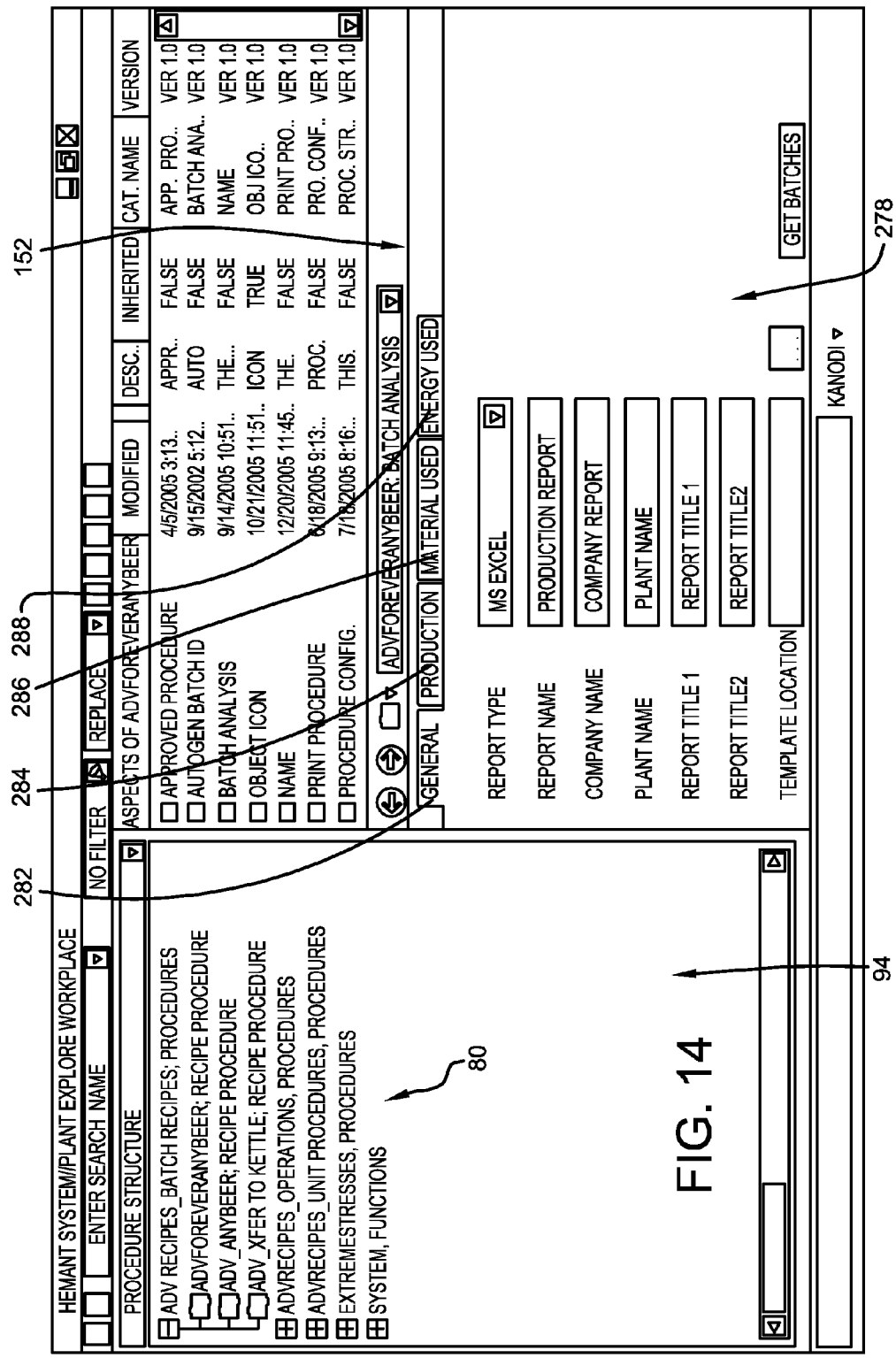
FIG. 14 is a screenshot of the plant explorer workplace in the GUI showing a general window of a management report view.
Figure 15:
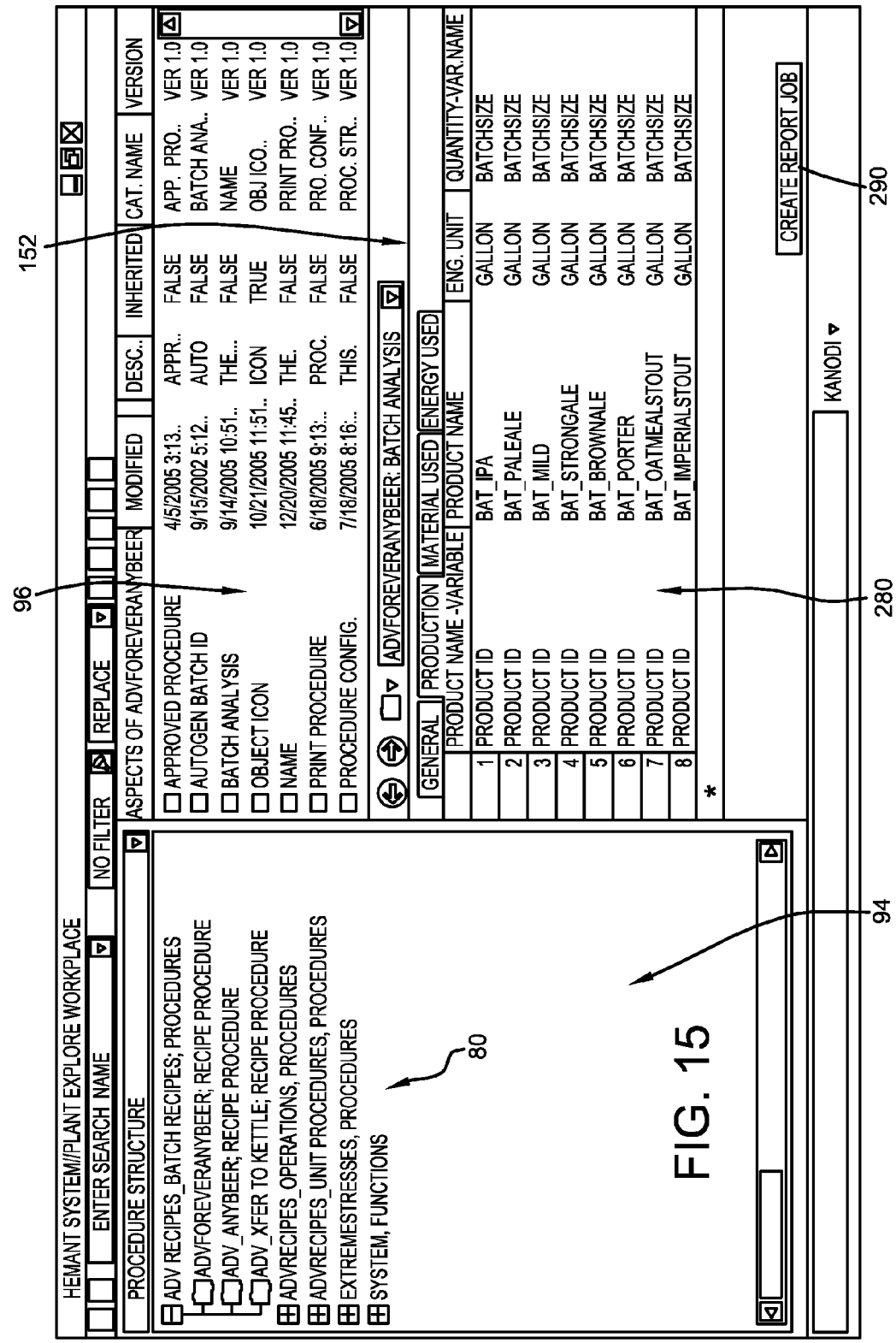
FIG. 15 is a screenshot of the plant explorer workplace in GUI showing a production window of the management report view.

Referring now to FIGS. 14 and 15, the management report view 152 provides a wizard for creating a report template for generating reports that are periodic and are not batch specific. A user will be able create multiple report templates, e.g., shift, daily, weekly, monthly and yearly. In one embodiment, the report templates are Excel spreadsheets. In another embodiment, the report templates are Crystal reports. The management report view 152 has a general window 278, a production window 280, a material-used window (not shown) and an energy-used window (not shown) accessible by a general tab 282, a production tab 284, a material-used tab 286 and an energy-used tab 288, respectively. A user adds general information, such as company name, plant name, report title, etc., in the general window 278. Product names for the batches and the engineering units for measuring the quantities of the batches are added in the production window 280. Information about the raw materials used to produce the batches is added in the material-used window, and information about the types of energy used to produce the batches, such as electricity, steam, fuel oil etc., is added in the energy-used window. Once a user has entered all available information, the user clicks on a "Create Report Job" button 290 at the bottom of the management report view 152, which creates a report template, which may be a Microsoft Excel file (.xls). This report template contains all formulae required to create a report.

Figure 16:
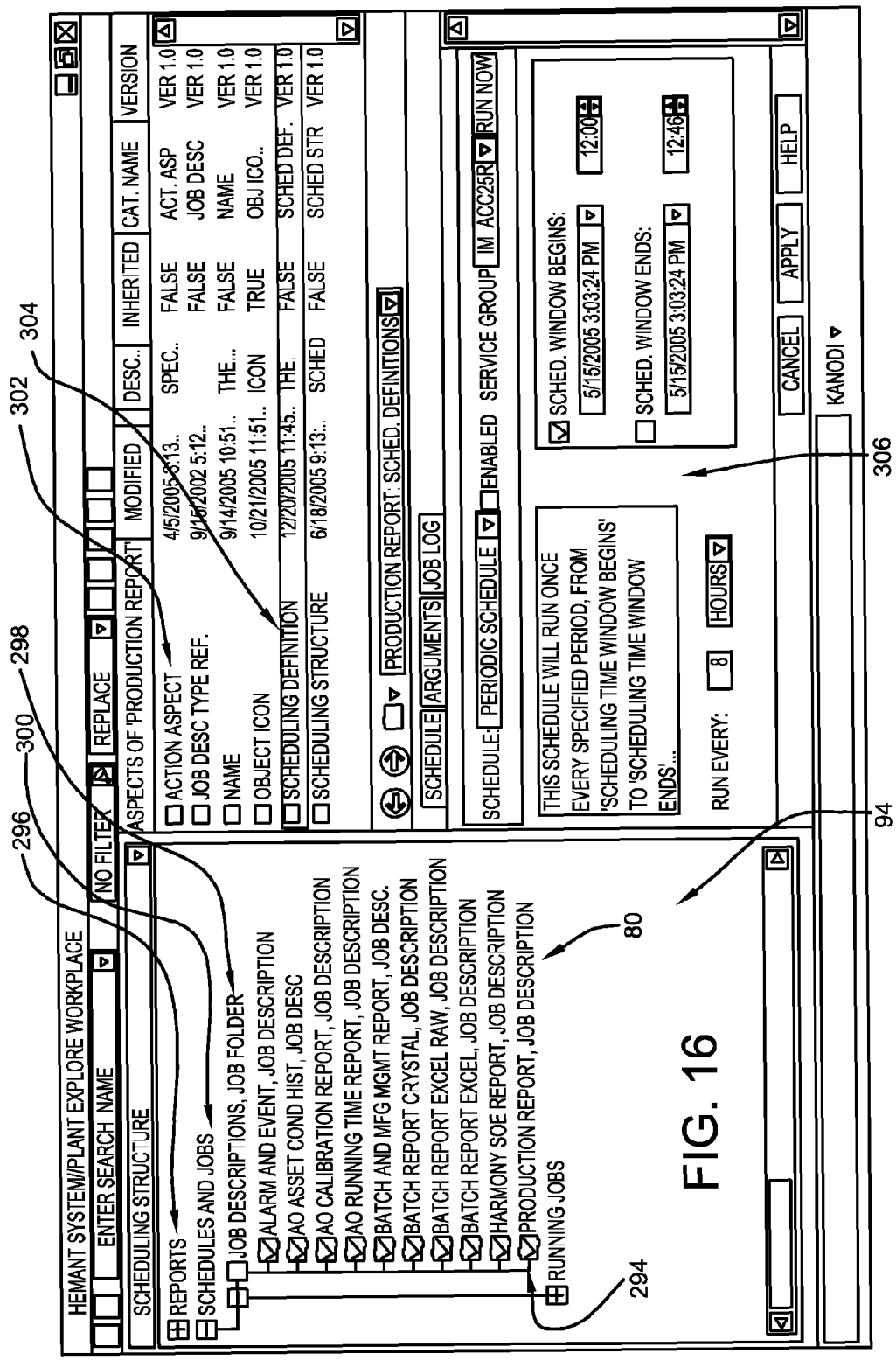
FIG. 16 is a screenshot of the plant explorer workplace in the GUI showing a Job Descriptions object, an Action aspect and a Scheduling Definition aspect.

Once a report template has been created, a report template object and a Job Description object 294 for the report template is created and configured in the GUI 66. The report template object is created in the scheduling structure of the plant explorer workplace, under a batch report templates object, which is a child object of a reports object 296 (shown in FIG. 16). A report template aspect is created and configured for the report template object. The job description object 294 is also created in the scheduling structure of the plant explorer workplace 86, except the job description object 294 is created under a job descriptions/job folder object 298, which is a child object of a schedules and jobs object 300. An action aspect 302 and a scheduling definition aspect 304 are created and configured for the job descriptions object 294. In a view 306 of the scheduling definition aspect 304, a user inputs the report interval (i.e., how often a report is automatically generated), and when the report generation should begin and end. In a view of the action aspect 302, a user provides a path to the report template (i.e., where the input parameters for the report are located) and sets the output routing for the report (i.e., where the report is to be transmitted). The report may be sent to a designated printer, transmitted via email to a designated email address and/or may be sent to the information management database 112 for archiving.

After the report template object and the job description object 294 and their aspects are created and configured, reports in the form of the report template are periodically generated and transmitted in accordance with the information entered in the action aspect 302 and the scheduling definition aspect 304.

While the invention has been shown and described with respect to particular embodiments thereof, those embodiments are for the purpose of illustration rather than limitation, and other variations and modifications of the specific embodiments herein described will be apparent to those skilled in the art, all within the intended spirit and scope of the invention. Accordingly, the invention is not to be limited in scope and effect to the specific embodiments herein described, nor in any other way that is inconsistent with the extent to which the progress in the art has been advanced by the invention.

What is claimed is:

1. A batch system for managing and analyzing batch runs of a batch process in a process cell, the batch system being adapted for use with a process automation system that is operable to monitor and control the batch process, the process automation system including at least one processor, an input device coupled to the at least one processor and configured to receive user input, and a display device coupled to the processor, the batch system comprising:

at least one computer readable medium;
program instructions stored on the at least one computer readable medium and executable by the at least one processor to:
display a first window on the display device through which batch runs can be scheduled;
display a second window on the display device through which process variable data for a hypothetical ideal batch run of the batch process is entered by a user;
receive real-time process variable data for a batch run of the batch process that is currently running; and
while the batch run is running, display a third window on the display device containing a trend graph showing a trend line formed from the process variable data for the hypothetical ideal batch run and a trend line formed from the real-time process variable data received from the batch run of the batch process.

2. The batch system of claim 1, wherein the second window comprises a first box into which the process variable data for the hypothetical ideal batch run is entered, and wherein the batch system further comprises a database stored on the at least one computer readable medium and containing data for previous batch runs.

3. The batch system of claim 2, wherein the process variable data for the hypothetical ideal batch run may be manually entered into the first box through the input device.

4. The batch system of claim 2, wherein the second window further comprises a second box, and wherein the program instructions are also executable to retrieve data for a previous batch run from the database and to display the retrieved data in the second box in the second window, and wherein the process variable data for the hypothetical ideal batch run may be entered into the first box by copying the data in the second box into the first box.

5. The batch system of claim 4, wherein the second window further comprises a third box, and wherein the program instructions are also executable to retrieve data for all batches meeting a user-selectable criteria from the database and to display a list of the retrieved batches in the third box, and wherein in response to a selection of a batch in the third box, the program instructions display the data for the selected batch in the second box.

6. The batch system of claim 5, wherein the first and second boxes comprise tables and the third box comprises a combo box.

7. The batch system of claim 5, wherein the user-selectable criteria comprises one of a period of time and a count.

8. The batch system of claim 2, wherein the process cell has first and second pieces of equipment, each of which is operable to perform a procedure of the batch process, and wherein the program instructions are also executable to:

display a fourth window on the display device through which batch runs are selected for analysis;

retrieve data for the selected batch runs from the database; and display a fifth window on the display device, the fifth window containing an average cycle time for all of the selected batch runs, an average cycle time for those of the selected batch runs performed with the first piece of equipment and an average cycle time for those of the selected batch runs performed with the second piece of equipment.

9. A batch system for managing and analyzing batch runs of a batch process in a process cell, the batch system being adapted for use with a process automation system that is operable to monitor and control the batch process, the process automation system including at least one processor, an input device coupled to the at least one processor and configured to receive user input, and a display device coupled to the processor, the batch system comprising:

at least one computer readable medium;

a database stored on the at least one computer readable medium and containing data for previous batch runs;

program instructions stored on the at least one computer readable medium and executable by the at least one processor to:

display a first window on the display device through which process variable data for a hypothetical ideal batch run of the batch process is entered by a user;

receive real-time process variable data for a batch run of the batch process that is currently running; and while the batch run is running, display a second window on the display device containing a trend graph showing a trend line formed from the process variable data for the hypothetical ideal batch run and a trend line formed from the real-time process variable data received from the batch run of the batch process;

display a third window on the display device through which criteria is entered for selecting batch runs for analysis;

display a fourth window on the display device that lists the selected batch runs and permits the marking of those of the selected batch runs that are deemed to be outlier batch runs;

retrieve process variable data for the selected batch runs from the database; and using the retrieved process variable data, display a fifth window on the display device containing a trend graph that includes trend lines for the selected batch runs that are not marked as outlier batch runs.

10. The batch system of claim 9, wherein the process cell has first and second pieces of equipment, each of which is operable to perform a procedure of the batch process, and wherein the program instructions are also executable to:

display a sixth window on the display device through which a second set of batch runs is selected for analysis;

retrieve data for the second set of batch runs from the database;

using the retrieved data, display a seventh window on the display device, the seventh window containing an average cycle time for all of the second set of batch runs, an average cycle time for those of the second set of batch runs performed with the first piece of equipment and an average cycle time for those of the selected batch runs performed with the second piece of equipment.

11. The batch system of claim 10, wherein the program instructions are also executable to identify those of the second set of batch runs that are outside a predetermined error level as being outlier batch runs, and wherein data for the outlier batch runs of the second set is not used to display the seventh window.

12. The batch system of claim 10, wherein the program instructions are also executable to display an eighth window on the display device through which batch runs can be scheduled.

13. The batch system of claim 9, wherein the program instructions are also executable to display a window on the display device that includes dynamic elements that can be manipulated by an operator to change control parameters for the batch process.

* * * * *